United States Patent [19]

Giles, Sr. et al.

[11] Patent Number: 4,902,316
[45] Date of Patent: Feb. 20, 1990

[54] OVEN INCLUDING A VENTLESS EXHAUST SYSTEM

[75] Inventors: William O. Giles, Sr., Montgomery; William T. McNeal, Pratville; Ted W. Giles, Montgomery, all of Ala.

[73] Assignee: Giles Enterprises, Inc., Montgomery, Ala.

[21] Appl. No.: 281,664

[22] Filed: Oct. 28, 1988

Related U.S. Application Data

[63] Continuation-in-part of Ser. No. 183,681, Apr. 19, 1988, Pat. No. 4,854,949.

[51] Int. Cl.$^4$ ............................................. B03C 3/01
[52] U.S. Cl. ......................................... 55/126; 55/316; 55/467; 55/DIG. 36; 99/403; 126/299 D
[58] Field of Search .................................. 55/124–126, 55/316, 467, DIG. 36; 99/403, 404, 408; 126/21 A, 299 R, 299 D, 299 F, 223 R

[56] References Cited

U.S. PATENT DOCUMENTS

| | | | |
|---|---|---|---|
| 4,350,504 | 9/1982 | Diachuk | 126/299 F |
| 4,489,646 | 12/1984 | Schmidt et al. | 99/408 X |
| 4,489,647 | 12/1984 | Stamps et al. | 99/336 |
| 4,556,046 | 12/1985 | Riffel et al. | 126/299 D |
| 4,643,167 | 2/1987 | Breuwer | 126/299 R |

Primary Examiner—Charles Hart
Attorney, Agent, or Firm—Berman, Aisenberg & Platt

[57] ABSTRACT

Apparatus for cooking food in a convention oven having a conveyor includes a ventless exhaust system in which a fan pulls heated air through a filter system including an aluminum filter, an electrostatic precipitator and a charcoal filter. Cleaned air may be recirculated within the building space in which the oven is located.

10 Claims, 1 Drawing Sheet

OVEN INCLUDING A VENTLESS EXHAUST SYSTEM

RELATED APPLICATION

This application is a continuation-in-part of Ser. No. 183,681, filed April 19, 1988, U.S. Pat. No. 4,854,949.

FIELD OF THE INVENTION

The invention relates to an oven having a ventless exhaust system for recirculating air to interior room space.

BACKGROUND OF THE INVENTION

Prior systems for exhausting food fumes and smoke from commercial cooking apparatus, such as ovens and food fryers, required the exhaust to be vented out of the building since it was not formerly possible to clean and deodorize grease-laden air sufficiently for recirculation into the room. Exhausting grease-laden fumes from a high-rise building is often difficult and costly. Known venting systems which discharge cooking fumes to the outside atmosphere may provide adequate air quality within the building, but air pollution outside the building from the cooking fumes may be malodorous to people passing in the street.

Stamps, U.S. Pat. No. 4,489,647, describes a ventless exhaust system only for use with an enclosed, small-scale, unpressurized, food frying and dispensing apparatus for cooking individual portions of food for which a short cooking cycle is sufficient and only a small quantity of grease-laden exhaust air is produced.

The patent to Glover, U.S. Pat. No. 3,747,301, describes a smoke eliminator for use above burners or grills, but does not address the problem of cleaning exhaust from large scale ovens or fryers sufficiently for recirculation. Gaylord, U.S. Pat. No. 3,785,124, includes a grease extractor hood section and a deodorizing section in order to purify air being vented to the outside atmosphere. King, U.S. Pat. No. 3,907,525, describes a similar system for cleaning air before exhausting it to the atmosphere. The patent to Ebert, U.S. Pat. No. 3,744,217, describes a high-voltage ozone-free electrostatic air filter suitable for use over a kitchen oven.

Other patents, such as those to Kuechler, U.S. Pat. Nos. 3,952,640 and 4,085,736 and 4,250,870, describe a vortex system for exhausting air.

SUMMARY OF THE INVENTION

An oven for cooking food, particularly for baking food such as pizza, may include a conveyor belt for moving the food through the oven. In a fan-assisted convection oven equipped with such a conveyor, a high volume of baked food may be produced.

Ventless air filtering apparatus is located in a hood substantially above the oven, and fumes rising from the oven during baking are drawn through the filter apparatus by a fan which circulates the grease and/or moisture-laden fumes through the filter apparatus, and then recirculates cleaned air into the room. The filter apparatus includes an aluminum filter for trapping and condensing grease and moisture, which may be positioned at an angle between about 10° and 80° to the horizontal, an electrostatic precipitator for removing particulates, and a charcoal filter for deodorizing the air. The cleaned air is pulled into a fan and recirculated into a room, such as the room in which the oven is located. Outside venting is not necessary.

An object of the invention is to provide a ventless exhaust system for an oven.

A further object of the invention is to provide apparatus for cleaning fumes rising from an oven, enabling the cleaned air to be recirculated back into interior space.

DETAILED DESCRIPTION OF THE INVENTION

A ventless exhaust hood for a fryer is described in our previous patent application, Ser. No. 183,681, filed Apr. 19, 1988, the disclosure of which is incorporated herein by reference. That application describes a ventless exhaust hood for a commercial frying apparatus which produces a substantial quantity of grease and/or moisture-laden heated air which rises from the fry pot. The ventless system recirculates the cleaned air into the room space in the building.

The ventless exhaust hood system of this application is used with an oven, for example a fan-assisted convection oven having a conveyor belt for rapidly cooking food as it moves through the oven. Such an oven can be used for baking a high volume of food, such as pizza or other oven-baked foods, which are sold in fast-food or specialty restaurants. Fumes from the oven are grease and aroma laden and must be cleaned before being discharged.

The apparatus described herein is suitable for use in high-rise buildings since the vented air is cleaned and purified, and may be recirculated to the space in which the oven is located or to other interior room or restaurant space. The cost of venting fumes to the outside atmosphere from high-rise buildings is substantial, due to the cost of duct work through a tall building, and the ventless exhaust system described herein is particularly economical and advantageous for use in such buildings.

Figure 1:
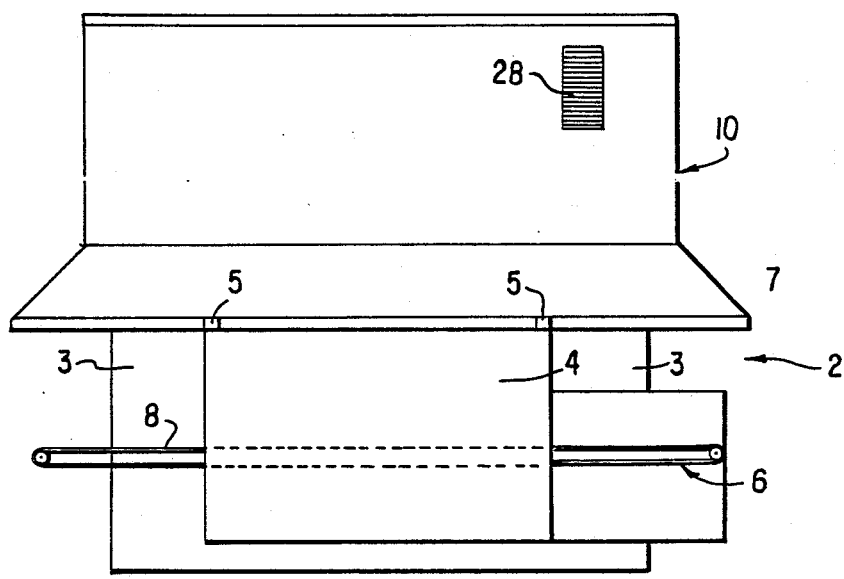
FIG. 1 is a schematic front elevation view of an oven and hood using a ventless exhaust system of the invention.
Figure 2:
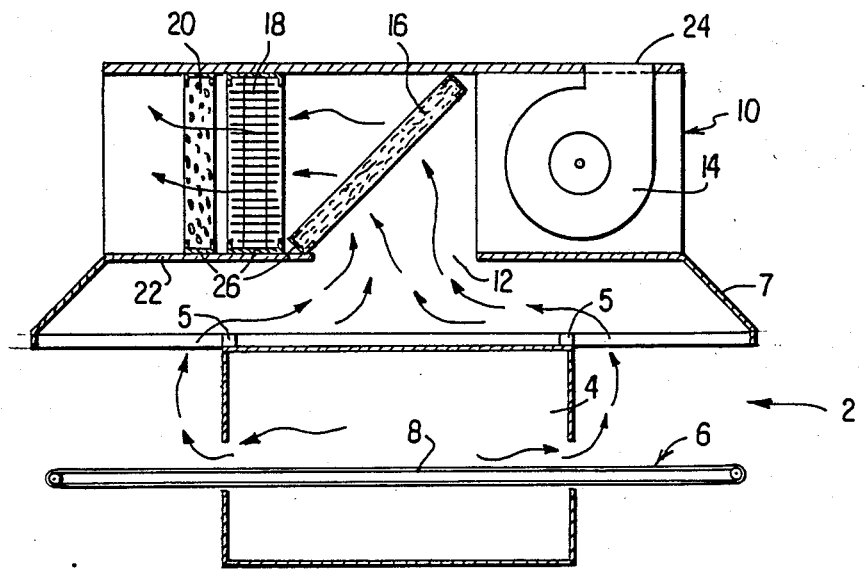
FIG. 2 is a schematic vertical cross-sectional view of an oven unit and hood.
Figure 3:
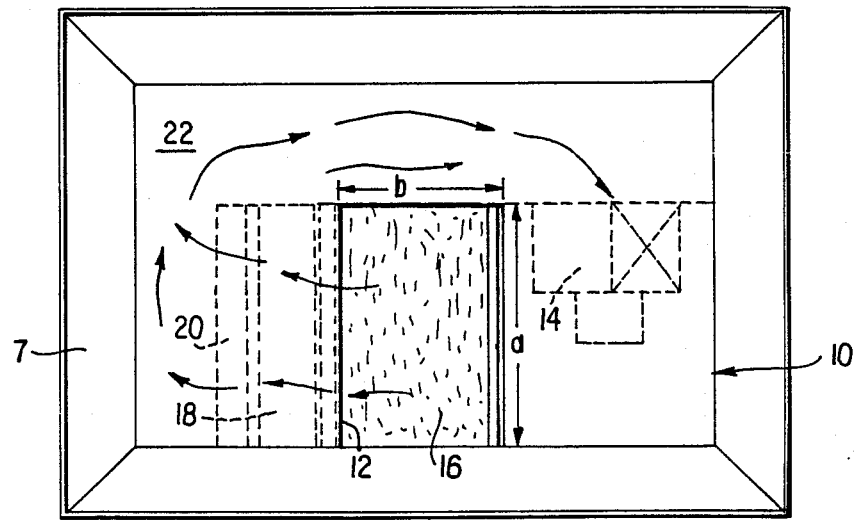
FIG. 3 is a bottom plan view of the hood.

With reference to FIGS. 1 to 3, in which like numerals represent like parts, FIG. 1 shows oven 2 which is a commercial conveyor oven, such as a pizza oven. Plate 3 is a wall-protecting plate. Oven unit 4 has conveyor belt 6 passing therethrough. The food is supported on the top surface 8 of conveyor belt 6 and is baked as the belt passes through the oven. Baking may take 3–15 minutes, for example. Several oven units using the same filter system may be stacked on top of one another and either floor mounted or wall supported.

Oven unit 4 is supported on mounting bars 5 which are secured across the top of the oven unit and fastened to edge 7 of hood 10. Hood 10 is thus fixed as a tent over oven unit 4 which is suspended from edges 7 by mounting bars 5. Other mounting means will be apparent.

Hood 10 which extends across the top area of oven unit 4 is particularly shown in FIGS. 2 and 3. Hood 10 has opening 12 communicating with the space above the oven through which the aroma and grease-laden vapors leaving the oven unit are pulled by forced air circulating fan 14. Direction of air circulation is shown by the arrows in FIGS. 2 and 3. Fumes leave the oven at openings for the conveyor and are drawn upwards into opening 12 of hood 10 by draft from fan 14.

Opening 12 is a relatively large open area sized to receive the oven fumes. Opening 12, shown in FIG. 3, preferably has substantially the same depth "a", from front to back, as the oven unit from which the fumes are pulled. If several oven units are stacked together, opening 12 may also receive fumes moved by fan 14 from other oven units or by ductwork or channels or other means known in the art. These fumes may be received directly into the hood area, as shown in FIG. 2, adjacent opening 12 to be mixed with the fumes leaving oven unit 4, before the fumes pass through the filters. Opening 12 which communicates with oven unit 4 preferably has a width "b", from side to side, shown in FIG. 2, shorter than the width of the filter 16 which traps grease and moisture in the fumes. Filter 16 may, for example, be an aluminum filter. Filter 16 is positioned transverse to the direction of air flow leaving the oven unit or units, at an angle allowing grease and moisture to drain down the filter. Filter 16 is positioned at an angle to the horizontal, which may be between about 10° and 80°, and which is preferably between about 50° and 70° to the horizontal. Grease and moisture trapped on the filter run down the filter surface and are collected in a collecting vessel (not shown) positioned below filter 16.

Air passing through grease filter 16 then passes through electrostatic filter 18 which is sized and positioned so that air passing through grease filter 16 necessarily also passes through electrostatic filter 18. In the example illustrated, electrostatic filter 18 has a height substantially the height of hood portion 10 and has substantially the same surface area as the cross-section of the hood passage in which the filter 18 is positioned. If required, electrostatic filter 18 can also be placed at an angle to the horizontal. Air leaving electrostatic filter 18, which has been cleaned of particulates as it passes through the electrostatic filter, then passes through charcoal filter 20 which absorbs aromatic impurities in the air. Charcoal filter 20 is sized and positioned (either vertically or at an angle) so that air passing through the hood necessarily passes through charcoal filter 20 after passing through electrostatic filter 18. Air leaving charcoal filter 20 is pulled by fan 14 through the hood area 22 and through fan 14 to leave the fan through fan exit 24 which may communicate with the air space in the room in which oven 2 is located.

The ventless exhaust system is particularly advantageous for use with a fan-assisted convection oven having a conveyor for passing the food through the oven. In a typical convection oven, at least 85% of the heat in the oven impinges on the food and is absorbed by the food as it is cooked. Other types of ovens may equally well be used.

The filters are each held in supports 26, known in the art. Grease filter 16, electrostatic filter 18 and charcoal filter 20 are similar to those used in the frying apparatus which is the subject of Ser. No. 183,681, the disclosure of which is incorporated herein by reference, as discussed above.

Electrostatic precipitator 18 is a known electronic cell such as is made, for example, by Honeywell, Inc. (Minneapolis, Minn.). The precipitator is optimally operated at about 90% to 95% of its capacity. Charcoal filter 20 includes a perforated case containing granular charcoal. As the heated air passes through the charcoal filter, the air is deodorized before being returned to the room. The charcoal may be in block form or in coagulated lumps held together with a binder.

Grease filter 16, electrostatic filter 18 and charcoal filter 20 may be arranged in a different sequence if required and one or more of these filters may be combined into a single unit. It is preferable that grease and moisture filter 16 is positioned at an angle to the horizontal so that condensates run down the filter and are collected. The collecting container is emptied or drained, as needed.

Fan 14 is a continuously operating fan, such as a squirrel fan, and the speed of operation of the fan is such that air flow through all sections of the filter system is controlled. Air leaving exit 24 of fan 14 is cleaned and of good quality so that it may be discharged back into the internal room space where the apparatus 2 is being operated, without needing to be discharged to the outside atmosphere. Moreover, the system may be an open unenclosed system. The fan pulls the air rising from the oven unit or units through the exhaust system before circulating clean air into the room. A typical fan operates at 1400 rpm and pulls 1,060 cubic feet of air per minute through the fan. Louvers 28 shown in FIG. 1, are air inlet louvers.

Test results of air quality of grease-laden air discharged from the fan show less than 0.1 gram impurities per cubic foot. This is well within the Underwriter's Laboratory specifications of air quality suitable for recirculating back into a building interior space.

The ventless hood of the invention obviates the need for providing an up-draft vent system through a building. This enables apparatus of the invention to be used in a high-rise building since air leaving the unit is sufficiently purified to be recirculated directly into the interior space. The oven of the invention may be either a freestanding unit or may be wallmounted. The unit needs no special wiring and no special exhaust system.

While the invention has been described above with respect to certain embodiments thereof, it will be appreciated that variations and modifications may be made without departing from the spirit and scope of the invention.

What is claimed is:

1. Apparatus for cooking food comprising:
   oven means for baking food, said oven means comprising conveyor means for moving food through the oven means;
   hood means comprising an opening for receiving fumes from the oven means;
   filter means for receiving and cleaning substantially all the fumes entering the hood means from the oven means, said filter means comprising electrostatic precipitator means for removing particulates from the fumes passing therethrough;
   fan means for moving said fumes through the filter means and for recirculating cleaned, filtered air having less the 0.1 gram/cubic foot impurities into interior room space.

2. Apparatus of claim 1 wherein the filter means comprises filter means for condensing moisture from the fumes passing therethrough.

3. Apparatus of claim 2 wherein the filter means further comprises charcoal filter means for deodorizing the fumes passing therethrough.

4. Apparatus of claim 3 wherein the condensing filter means has a width substantially the same as the width of said opening.

5. Apparatus of claim 3 wherein the condensing filter means is positioned at an angle between about 10° and 80° to the horizontal, sloping upwardly, and having one edge portion positioned substantially adjacent an edge portion of an adjacent filter means and having a remote edge portion spaced from another edge portion of said adjacent filter means.

6. Apparatus of claim 5 wherein the condensing filter means is positioned at an angle between about 40° and 70° to the horizontal.

7. Apparatus of claim 2 wherein the electrostatic precipitator means is operated at 90-95% capacity.

8. Apparatus of claim 1 further comprising convection means for circulating heat in the oven means.

9. Apparatus of claim 4 wherein the heated air is exhausted through the condensing filter means, electrostatic precipitator means, charcoal filter means and fan means in sequence.

10. Apparatus for cooking food comprising:
   oven means for baking food;
   conveyor means for moving food through the oven means;
   hood means comprising an opening for receiving fumes from the oven means;
   filter means for receiving and cleaning substantially all the fumes entering the hood means from the oven means, said filter means comprising condensing filter means transverse to the direction of air flow having a width substantially the same as the width of said opening and positioned at an angle between about 40° and 70° to the horizontal, and electrostatic precipitator means for removing particulates from said fumes; and
   fan means for moving said fumes through the filter means and recirculating cleaned, filtered air having less than 0.1 gram/cubic foot impurities into interior room space;
   hood means including an opening for receiving heated air and fumes from a conveyor oven;
   filter means within the hood means for receiving and cleaning the fumes entering the hood means, said filter means comprising electrostatic precipitator means for removing particulates from the fumes passing threthrough; and
   fan means within the hood means for moving said fumes through the filter means and for recirculating clean, filtered air having less than 0.1 gram per cubic foot impurities into interior room space.

* * * * *